(12) United States Patent
Ono et al.

(10) Patent No.: US 12,090,559 B2
(45) Date of Patent: Sep. 17, 2024

(54) TOOL DRIVING DEVICE AND METHOD OF PRODUCING DRILLED PRODUCT

(71) Applicant: SUBARU CORPORATION, Tokyo (JP)

(72) Inventors: Ryohei Ono, Tokyo (JP); Masao Watanabe, Tokyo (JP); Tatsuo Nakahata, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 153 days.

(21) Appl. No.: 17/673,040

(22) Filed: Feb. 16, 2022

(65) Prior Publication Data
US 2022/0288700 A1 Sep. 15, 2022

(30) Foreign Application Priority Data
Mar. 11, 2021 (JP) ................................. 2021-039744

(51) Int. Cl.
*B23B 47/26* (2006.01)
*B23B 31/107* (2006.01)

(52) U.S. Cl.
CPC ............ *B23B 47/26* (2013.01); *B23B 31/107* (2013.01)

(58) Field of Classification Search
CPC ..... B23B 45/003; B23B 45/008; B23B 47/34; B23B 47/26; B23B 51/12; B23B 29/125; B28D 17/005; B28D 11/005; B28D 11/10; B28D 11/102; B28D 11/104; B28D 16/00; B28D 16/003; B28D 2250/195; B28D 2250/201; B28D 2250/205; B28D 2250/32; B28D 1/26; B25B 21/026; B25B 21/023; B25B 21/02
(Continued)

(56) References Cited

U.S. PATENT DOCUMENTS 2,742,265 A * 4/1956 Snyder ...................... E21B 4/10
 175/324
2,770,974 A * 11/1956 Werner .................. B23D 13/00
 74/54

(Continued)

FOREIGN PATENT DOCUMENTS

DE 198 21 554 A1 11/1999
EP 489359 A1 * 6/1992 ............. B23B 47/34
(Continued)

OTHER PUBLICATIONS

Extended European Search Report dated Jul. 29, 2022 for European Patent Application No. 22154953.8 (8 pages).
(Continued)

*Primary Examiner* — Nicole N Ramos
(74) *Attorney, Agent, or Firm* — Smith, Gambrell & Russell, LLP (57) ABSTRACT

According to one implementation, a tool driving device includes a drill chuck, a motor, a casing and a vibrating mechanism. The drill chuck holds a drill. The motor is configured to rotate the drill chuck. The casing houses the motor. The vibrating mechanism is configured to periodically reciprocate the drill chuck relatively to the casing in a tool axis direction during rotation of the drill chuck. The vibrating mechanism is configured to distance the drill chuck from the casing at a first speed smaller than a second speed for bringing the drill chuck close to the casing.

19 Claims, 5 Drawing Sheets

(58) Field of Classification Search
USPC .......................................................... 407/17
See application file for complete search history.

(56) References Cited

U.S. PATENT DOCUMENTS

| | | | | |
|---|---|---|---|---|
| 2,923,191 | A * | 2/1960 | Fulop | B25B 21/023 |
| | | | | 81/474 |
| 2,940,565 | A * | 6/1960 | Schodeberg | B25B 21/026 |
| | | | | 173/93.6 |
| 3,106,274 | A | 10/1963 | Madsen | |
| 3,133,601 | A * | 5/1964 | Fulop | B25D 11/104 |
| | | | | 173/101 |
| 3,149,681 | A * | 9/1964 | Drew | B25D 17/005 |
| | | | | 173/203 |
| 3,235,014 | A * | 2/1966 | Brooks | E21B 7/24 |
| | | | | 175/207 |
| 3,256,946 | A * | 6/1966 | Wilhelm | B25D 11/102 |
| | | | | 173/205 |
| 5,992,538 | A * | 11/1999 | Marcengill | B25D 11/102 |
| | | | | 173/171 |
| 6,138,772 | A | 10/2000 | Miescher et al. | |
| 6,213,222 | B1 | 4/2001 | Banach | |
| 10,738,553 | B2 * | 8/2020 | Wiercigroch | E21B 7/24 |
| 2007/0181321 | A1 * | 8/2007 | Ha | B23B 45/003 |
| | | | | 173/122 |
| 2009/0110496 | A1 | 4/2009 | Veres | |
| 2010/0252290 | A1 * | 10/2010 | Grand | B23B 51/12 |
| | | | | 173/115 |

FOREIGN PATENT DOCUMENTS

| | | | |
|---|---|---|---|
| EP | 2 052 809 A1 | | 4/2009 |
| EP | 3 753 676 A1 | | 12/2020 |
| FR | 1423047 A | * | 1/1966 |
| GB | 877794 | | 9/1961 |
| GB | 1 346 537 A | | 2/1974 |
| JP | S54-054992 U | | 4/1979 |
| JP | 56107812 A | * | 8/1981 |
| JP | H06-98579 B2 | | 12/1994 |
| JP | H10-505 A | | 1/1998 |
| JP | H11-33825 A | | 2/1999 |
| JP | 2003-117852 A | | 4/2003 |
| JP | 2003-286426 A | | 9/2003 |
| JP | 2019-214079 A | | 12/2019 |
| WO | 2019/158114 A1 | | 8/2019 |

OTHER PUBLICATIONS

Extended European Search Report dated Jan. 23, 2024 for European Patent Application No. 23189950.1 (10 pages). [Family member of U.S. Appl. No. 18/364,573].

U.S. Appl. No. 18/364,573, filed Aug. 3, 2023, Ryohei Ono, et al.

Non Final Office mailed Jun. 5, 2024 for U.S. Appl. No. 18/364,573 (7 pages).

Japanese Office Action mailed Jun. 14, 2024 for Japanese Patent Application No. 2021-039744 (3 pages in Japanese; 4 pages English translation).

* cited by examiner

TOOL DRIVING DEVICE AND METHOD OF PRODUCING DRILLED PRODUCT

CROSS REFERENCES TO RELATED APPLICATIONS

This application is based upon and claims the benefit of priority from Japanese Patent Application No. 2021-39744, filed on Mar. 11, 2021; the entire contents of which are incorporated herein by reference.

FIELD

Implementations described herein relate generally to a tool driving device and a method of producing a drilled product.

BACKGROUND

It is important for drilling to finely cut and discharge chips so that grooves of a drill may not be clogged with the chips. For that reason, a mechanism for cutting chips finely by intentionally vibrating a drill in a tool axis direction has been suggested conventionally (for example, refer to Japanese Patent Application Publication JP 2003-117852A and Japanese Patent Application Publication JP 2003-266426A).

Specifically, a spindle can be vibrated in the rotation axis direction by putting balls, held by a retainer, in and out from concave portions rotated together with the spindle. More specifically, a drill moves together with the spindle in a direction away from an object to be drilled (workpiece) when the balls are put in the concave portions respectively while the drill moves together with the spindle in a direction toward the workpiece when the balls are put out from the concave portions respectively. Thereby, the spindle and the drill can be periodically reciprocated in the tool axis direction with constant amplitude.

However, when the conventional vibrating mechanism is used, a drill separates from a workpiece for a moment at the timing of entry of each ball into a concave portion, and subsequently the drill is suddenly pushed out toward the workpiece at the timing of exit of each ball from the concave portion. For this reason, when a user performs drilling using a handheld tool driving device, the tool driving device possibly held with loosen force may be pushed back due to drilling reaction. Consequently, drilling cannot be restarted promptly after the balls are put out from the concave portions respectively.

Conversely, when a user holds a handheld tool driving device with force, a drill collides with a workpiece at the timing of exit of each ball from the concave portion. Therefore, when the workpiece has large strength compared to that of the drill, the drill may be damaged. As a concrete example, when titanium is drilled with adopting the conventional vibrating mechanism, a drill may be damaged since titanium has strength larger than that of typical material of the drill.

Therefore, when hard-to-cut material, such as titanium, may be drilled, the conventional vibrating mechanism cannot be adopted. As a result, when metal, such as aluminum, as well as hard-to-cut material, such as titanium, is drilled by a tool driving device having no vibrating mechanism, a discharged continuous chip of the metal cannot be divided, and thereby may clog a groove of the drill. When a groove of the drill is clogged with a chip, a problem that rotation of the drill stops or a workpiece is damaged may arise.

In particular, in a case where laminated material of metal and FRP (Fiber Reinforced Plastic), such as GFRP (Glass Fiber Reinforced Plastic) or CFRP (Carbon Fiber Reinforced Plastic), which is also called composite material, is drilled from the FRP side, a problem that a drill is clogged with a metal chip, and thereby it becomes difficult to continue drilling, or a problem that the hole size of the FRP becomes excessive as a result that the inner surface of the FRP is cut by the drill clogged with a metal chip may arise when the drilling of the metal starts after the drilling of the FRP has been completed.

Accordingly, an object of the present invention is to make it possible to drill a workpiece stably by preventing chip clogging in a drill and breakage of the drill.

SUMMARY OF THE INVENTION

In general, according to one implementation, a tool driving device includes a drill chuck, a motor, a casing and a vibrating mechanism. The drill chuck holds a drill. The motor is configured to rotate the drill chuck. The casing houses the motor. The vibrating mechanism is configured to periodically reciprocate the drill chuck relatively to the casing in a tool axis direction during rotation of the drill chuck. The vibrating mechanism is configured to distance the drill chuck from the casing at a first speed smaller than a second speed for bringing the drill chuck close to the casing.

Further, according to one implementation, a method of producing a drilled product includes: holding the drill by the above-mentioned tool driving device; and producing the drilled product by drilling an object by the drill rotated by the tool driving device.

DETAILED DESCRIPTION

A tool driving device and a method of producing a drilled product according to implementations of the present invention will be described with reference to accompanying drawings.

(First Implementation)
(Structure and Function)

Figure 1:
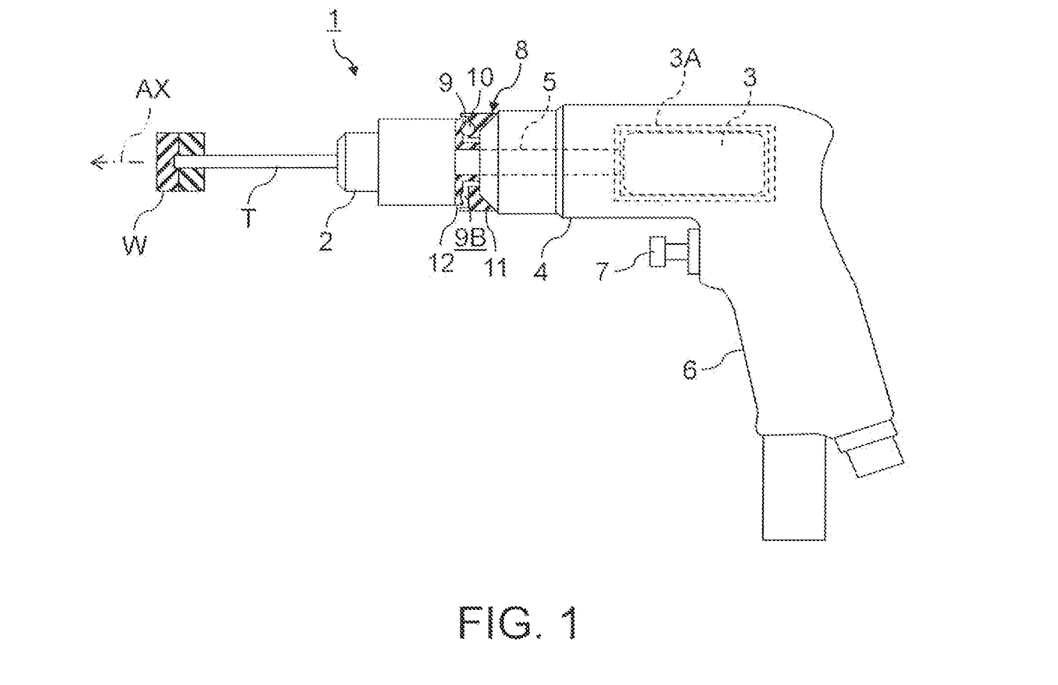
FIG. 1 is a partial sectional view showing structure of a tool driving device according to the first implementation of the present invention.

FIG. 1 is a partial sectional view showing structure of a tool driving device according to the first implementation of the present invention.

A tool driving device 1 is a device for holding and rotating a drill T in order to drill a workpiece W to be drilled. Note that, there is a case where a boring tool held by the tool driving device 1 is called a drill bit while the tool driving device 1 itself for rotating a drill bit is called a drill.

The tool driving device 1 may include not only a rotating mechanism of the drill T, but a feeding mechanism of the drill T. That is, the drill T may be fed out towards the workpiece W by pushing out the tool driving device 1 itself by a user. Alternatively, the drill T may be fed out towards the workpiece W automatically or semiautomatically by a tool feeding mechanism.

The tool driving device 1 can be composed of a drill chuck 2 for holding the drill T, a motor 3 for rotating the drill chuck 2, and a casing 4 for housing the motor 3. The motor 3 may be any of an electric type, a hydraulic type, a pneumatic type, and another type. The output shaft of the motor 3 can be operated as a spindle 5 which rotates the drill chuck 2 together with the drill T. In other words, the output shaft of the motor 3 may be integrated with the spindle 5. As a matter of course, the output shaft of the motor 3 and the spindle 5 may be disposed in parallel, and torque may be transmitted by gears or the like.

When the tool driving device 1 is handheld, a grip 6 for being grasped by a user is formed in the casing 4. A switch 7 for operating the motor 3 may be attached to the grip 6 or the vicinity of the grip 6.

In addition, the tool driving device 1 include a vibrating mechanism 8 which periodically reciprocates the drill T, the drill chuck 2, and the spindle 5 relatively to the casing 4 in a tool axis AX direction during rotation of the drill T, the drill chuck 2, and the spindle 5. When the spindle 5 is reciprocated in the tool axis AX direction, the motor 3 is also reciprocated in the tool axis AX direction as long as the motor 3 is typical.

Accordingly, a clearance may be made between the motor 3 and a motor casing 3A for housing the motor 3, for example, so that the motor 3 can be reciprocated in the tool axis AX direction although the motor casing 3A originally houses the motor 3 without any clearance.

When the drill T and the drill chuck 2 are periodically reciprocated in the tool axis AX direction by the vibrating mechanism 8 by a distance of 0.01 mm to 0.15 mm which is slight compared to a feeding amount, a discharged continuous chip like a metal chip can be divided. In other words, when the drill T and the drill chuck 2 are vibrated with amplitude of 0.01 mm to 0.15 mm, a chip can be divided. As a result, the drill T can be prevented from being clogged with a chip.

This is because moving the drill T and the drill chuck 2 in the direction toward the casing 4 results in separation of the drill T from the workpiece W once during cutting, and thereby drilling is interrupted. After that, the cutting can be restarted by feeding the drill T and the drill chuck 2. Such processing that drilling is intermittently performed while discharging chips by repeating cutting and intermission alternately is also called peck processing, peck drilling or step drilling.

Note that, too small amplitude of the vibration, which is concretely amplitude of less than 0.01 mm, results in insufficiency in the dividing effect of a chip while too large amplitude of the vibration, which is concretely amplitude of more than 0.15 mm, makes it difficult for a user to hold the tool driving device 1 by hand.

In particular, the vibrating mechanism 8 is configured to distance the drill T and the drill chuck 2 from the casing 4 at a speed smaller than that for bringing the drill T and the drill chuck 2 close to the casing 4. That is, the drill T vibrates at different speeds between the forward path and the return path. More specifically, the drill T and the drill chuck 2 are instantaneously moved in the direction toward the casing 4 in order to interrupt drilling once by distancing the drill T, during cutting, from the workpiece W while the drill T and the drill chuck 2 are moved as slowly as possible in the direction away from the casing 4 in order to bring the drill T and the drill chuck 2, distanced from the workpiece W once, close to the workpiece W again.

Accordingly, the drill T is instantaneously pulled apart from the workpiece W, and thereby a chip can be divided certainly by intermission of drilling. Meanwhile, the drill T is moved toward the workpiece W at a low speed at the time of restarting the drilling, and therefore trouble that the drill T collides to the workpiece W, and thereby the drill T is damaged can be prevented. In addition, since the drill T is moved toward the workpiece W at a low speed just after restarting the drilling, the increasing rate of the drilling reaction can be reduced, and thereby trouble that a user is pushed back due to precipitous increase in drilling reaction can be avoided.

The vibrating mechanism 8 can consist of a sliding surface 9 and balls 10. The sliding surface 9 has recesses and projections corresponding to the moving speed of the drill T and the drill chuck 2. The balls 10 roll on the sliding surface 9 during rotation of the drill chuck 2. Note that, the vibrating mechanism 8, i.e., the vibrator can also consist of the sliding surface 9 and rolling objects, such as rollers each having a rotation shaft, skids, or disk members each having smooth convexity to which lubricity is given, sliding on the recesses and projections of the sliding surface 9, instead of the balls 10. Henceforth, the most practical case where the balls 10 are used will be described as an example.

Figure 2:
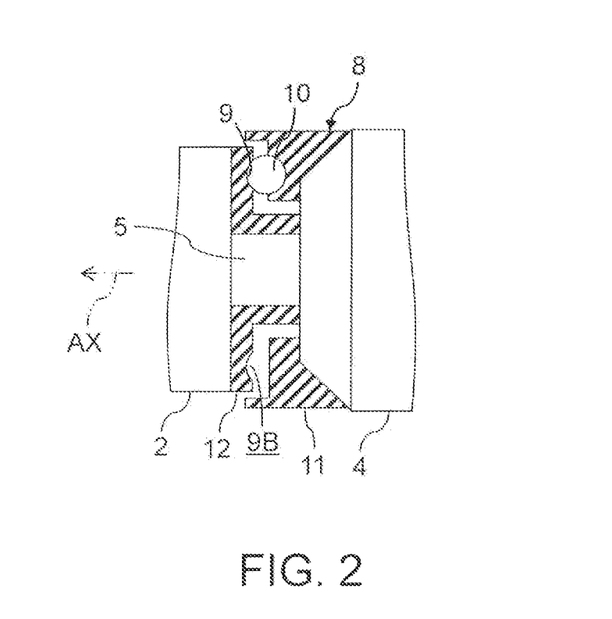
FIG. 2 is an enlarged partial longitudinal sectional view of the vibrating mechanism shown in FIG. 1.
Figure 3:
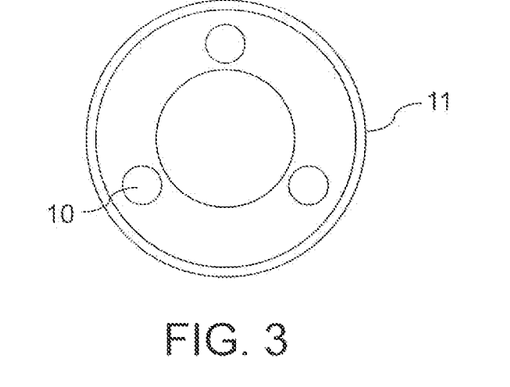
FIG. 3 is a left side view of a static ring included in the vibrating mechanism shown in FIG. 2 in a state where the balls have been placed on the static ring.
Figure 4:
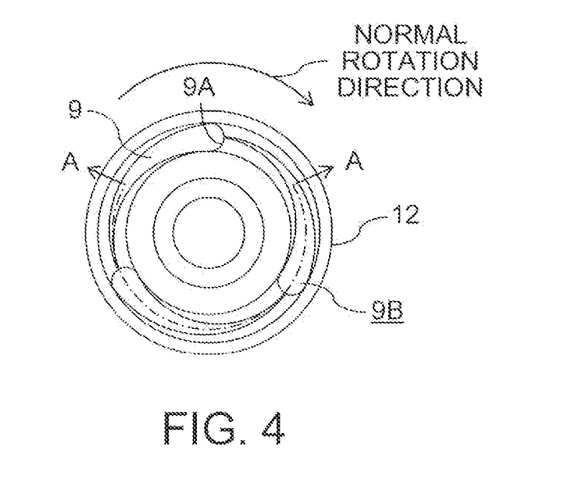
FIG. 4 is a right side view of a rotary ring included in the vibrating mechanism shown in FIG. 2.
Figure 5:
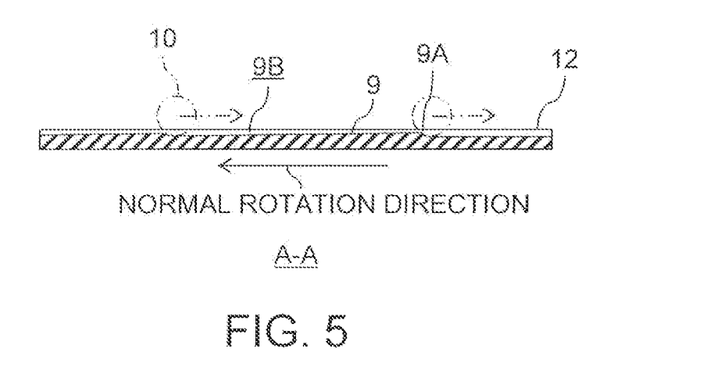
FIG. 5 shows the cross section, developed on a plane, of the rotary ring at the position A-A shown in FIG. 4.
Figure 6:
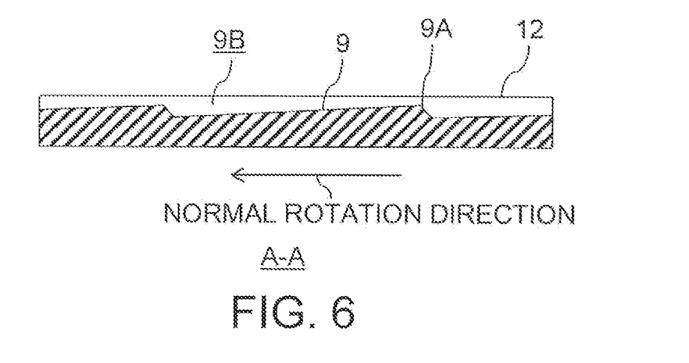
FIG. 6 shows the recesses and projections of the rotary ring emphasized by enlarging the developed cross sectional view of the rotary ring shown in FIG. 5 only in the thickness direction of the rotary ring.

FIG. 2 is an enlarged partial longitudinal sectional view of the vibrating mechanism 8 shown in FIG. 1. FIG. 3 is a left side view of a static ring 11 included in the vibrating mechanism 8 shown in FIG. 2 in a state where the balls 10 have been placed on the static ring 11. FIG. 4 is a right side view of a rotary ring 12 included in the vibrating mechanism 8 shown in FIG. 2. FIG. 5 shows the cross section, developed on a plane, of the rotary ring 12 at the position A-A shown in FIG. 4. FIG. 6 shows the recesses and projections of the rotary ring 12 emphasized by enlarging the developed cross sectional view of the rotary ring 12 shown in FIG. 5 only in the thickness direction of the rotary ring 12.

The balls 10 are equally spaced on a same circle between the drill chuck 2 and the casing 4 so that the respective balls 10 can roll. The sliding surface 9 to which the balls 10 contact while rolling during rotation of the drill chuck 2 can be formed directly or indirectly in either the drill chuck 2 or the casing 4.

For that purpose, in the illustrated example, the static ring 11 and the rotary ring 12 are fixed to the casing 4 and the drill chuck 2 respectively with a space so that the static ring 11 and the rotary ring 12 may not contact with each other. The static ring 11 has a through hole for passing through the spindle 5 at the center portion. The rotary ring 12 also has a through hole for passing through the spindle 5 at the center portion. Note that, the rotary ring 12 may be fixed to the spindle 5 by forming a female screw on the inner surface of the through hole of the rotary ring 12 while forming a male screw on the surface of the spindle 5. Therefore, the rotary ring 12 rotates together with the drill chuck 2 and the spindle 5 relatively to the casing 4 and the static ring 11 although the static ring 11 does not rotate relatively to the casing 4.

The balls 10 are partially housed in spherical concaves, formed on the static ring 11 at an equal interval on a same circle, respectively in a state where the respective balls 10 can roll. Accordingly, the balls 10 respectively roll at constant positions relative to the casing 4 to which the static ring 11 is fixed. In this case, the static ring 11 functions as an annular ball retainer for holding a part of each ball 10 in a state where each ball 10 can roll.

On the other hand, the rotary ring 12 has the sliding surface 9 having the recesses and projections. The shape of the recesses and projections of the sliding surface 9 is made to have level differences 9A at an equal interval while changing smoothly from each level difference 9A toward the adjacent level difference 9A so that the balls 10 may fall down from the level differences 9A simultaneously during the normal rotation of the drill chuck 2 while the balls 10 may ascend no level differences during the normal rotation of the drill chuck 2. That is, the shape of the recesses and projections of the sliding surface 9 is determined so that the balls 10 simultaneously fall down from the level differences 9A of the sliding surface 9, and subsequently roll on the smoothly sloping surfaces up to the following level differences 9A respectively since there are no level differences which the balls 10 have to ascend, as exemplified by FIG. 5 and FIG. 6, as long as the drill T and the drill chuck 2 are normally rotated by the normal rotation of the motor 3.

In this case, the balls 10 simultaneously fall down from the level differences 9A of the sliding surface 9 respectively due to the drilling reaction from the workpiece W in the midst of drilling by the normal rotation of the drill T and the drill chuck 2 since the rotary ring 12, having the sliding surface 9, fixed to the drill chuck 2 rotates relatively to the balls 10. As a result, the drill T and the drill chuck 2 are momentarily and temporarily distanced from the workpiece W to approach the casing 4. Thereby, the drilling is interrupted, and a chip can be divided.

On the contrary, after the balls 10 have fallen down from the higher positions of the level differences 9A to the lower positions respectively, the balls 10 roll on the sliding surface 9, of which position changes smoothly, up to the higher positions of the adjacent level differences 9A respectively while contacting with the sliding surface 9 since the drill T and the drill chuck 2 are fed, and thereby receive the drilling reaction from the workpiece W again. Consequently, the drill T and the drill chuck 2 do not collide with the workpiece W at a high speed, and therefore the drilling reaction from the workpiece W does not increase locally. As a result, a user can continue drilling stably without being pushed back by the drilling reaction from the workpiece W while avoiding breakage of the drill T.

The sliding surface 9 can be formed as the inner surface of a groove 9B whose length direction is the rotation direction including the normal rotation direction and the reverse rotation direction of the drill chuck 2, as illustrated. In that case, the groove 9B has such slopes that the depth of the groove 9B shallows gradually from the respective level differences 9A, formed on the inner surface of the groove 9B, toward the adjacent level differences 9A.

Generally, the normal rotation is the clockwise rotation, and therefore the groove 9B of the rotary ring 12 rotates together with the drill chuck 2 clockwise relatively to the balls 10. Hence, the balls 10 rotate counterclockwise relatively to the groove 9B of the rotary ring 12. For this reason, each level difference 9A is formed in the groove 9B in the direction where the balls 10 fall down when the balls 10 rotate counterclockwise relatively to the annular groove 9B, as exemplified by FIG. 4 to FIG. 6. In other words, the groove 9B has the level differences 9A, from which the balls 10 fall down over the ridgelines when the balls 10 rotate counterclockwise relatively to the annular groove 9B, i.e, the balls 10 move rightward relatively to the groove 9B in the developed views shown in FIG. 5 and FIG. 6, and no level differences whose ridgelines are targets which the balls 10 have to ascend. Note that, in case of special drilling by rotating the drill T counterclockwise, what is necessary is to reverse the direction of the level differences 9A and the slopes.

Note that, the sliding surface 9 may be a tapered or corrugated surface having the level differences 9A in the same direction in the rotating direction of the drill chuck 2, instead of the inner surface of the groove 9B.

When the groove 9B is formed for the sliding surface 9, the groove 9B may be a V-groove whose cross section is V-shaped, a groove whose bottom surface is flat, or the like. When the shape of at least a part of the cross section of the groove 9B is made to an arc having the same radius as that of each ball 10 so that the balls 10 may fit to a part of the bottom of the groove 9B as illustrated, progress of wear of the balls 10 can be delayed since the balls 10 do not come into point contact with the groove 9B but come into line contact with the groove 9B. When the shape of the cross section of the groove 9B is made to an arc, the groove 9B is formed by groove machining using a ball end mill in many cases. For this reason, the valley side of each level difference 9A may be rounded.

Although the bottom of the groove 9B is wholly sloped between the level differences 9A adjacent to each other in the example shown in FIG. 5 and FIG. 6, ranges in which the bottom is sloped may be limited to parts beginning at the valley sides of the level differences 9A while the remaining portions toward the mountain sides of the adjacent level differences 9A may not have sloped bottoms respectively as long as edges of level differences which the balls 10 must ascend disappear.

Figure 7:
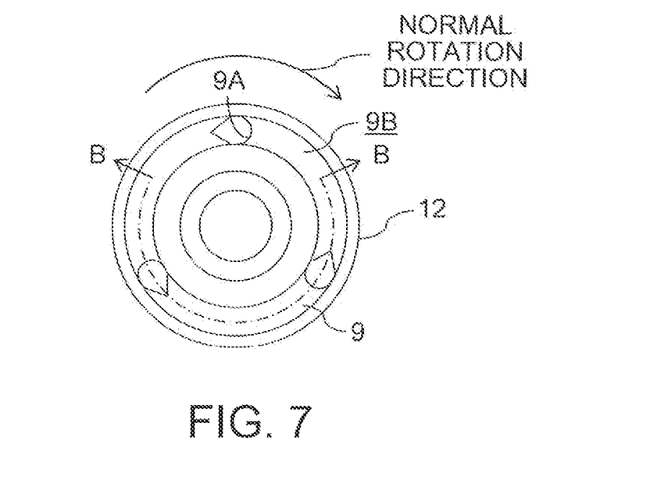
FIG. 7 is a right side view of another example of the rotary ring shown in FIG. 2 in a case where ranges in which the bottom face of the groove formed on the rotary ring slopes have been limited to the vicinities of the valley side portions of the level differences respectively.
Figure 8:
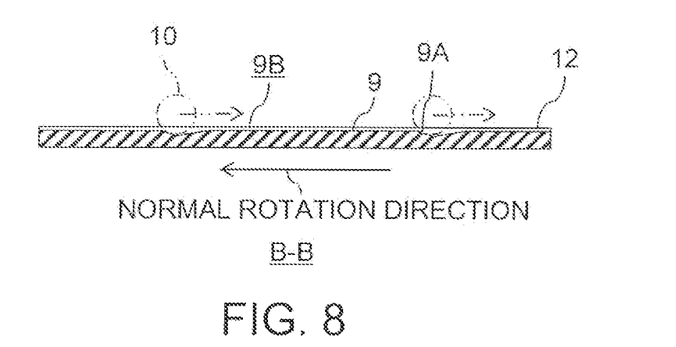
FIG. 8 shows the cross section, developed on a plane, of the rotary ring at the position B-B shown in FIG. 7.
Figure 9:
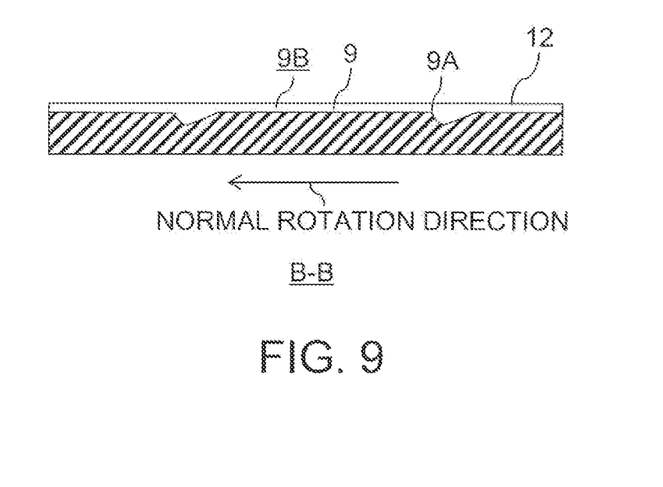
FIG. 9 shows the recesses and projections of the rotary ring emphasized by enlarging the developed cross sectional view of the rotary ring shown in FIG. K only in the thickness direction of the rotary ring.

FIG. 7 is a right side view of another example of the rotary ring 12 shown in FIG. 2 in a case where ranges in which the bottom face of the groove 9B formed on the rotary ring 12 slopes have been limited to the vicinities of the valley side portions of the level differences 9A respectively. FIG. 8 shows the cross section, developed on a plane, of the rotary ring 12 at the position B-B shown in FIG. 7. FIG. 9 shows the recesses and projections of the rotary ring 12 emphasized by enlarging the developed cross sectional view of the rotary ring 12 shown in FIG. 8 only in the thickness direction of the rotary ring 12.

As exemplified by FIG. 7 to FIG. 9, the ranges in which the bottom of the groove 9B is sloped may be limited to the vicinities of the valley side portions of the level differences 9A as long as the edges of the level differences which the balls 10 ascend are not generated. In this case, the shape of the rotary ring 12 can be simplified since the bottom of the groove 9B is not oblique on the mountain sides of the level differences 9A. Therefore, production of the rotary ring 12 can be also simplified. In particular, the smaller the height of each level difference 9A is, the shorter each range in which the bottom of the groove 9B is sloped can be made in order to remove an edge of a level difference, which the balls 10 must ascend, to a negligible degree.

The above-mentioned sliding surface 9 formed by the inner surface of the sloped groove 9B or the like has the level differences 9A at an equal interval, and therefore normally rotating the drill T and the drill chuck 2 at a predetermined rotating speed causes periodic vibration of the drill T and the drill chuck 2 at amplitude equivalent to the height of the level differences 9A. That is, once the balls 10 ascend the ridgelines of the level differences 9A, the moving direction of the drill T and the drill chuck 2 is reversed, and thereby drilling is interrupted.

Therefore, the height of the level differences 9A from which the balls 10 fall down can be determined so that a user can hold the tool driving device 1 by hand while the vibration has desired amplitude from a viewpoint of achieving the diving effect of chip, concretely to not less than 0.01 mm and not more than 0.15 mm as described above. Note that, the size of the balls 10 is not important, but the moving distance of the balls 10 in the tool axis AX direction, i.e., the height of the level differences 9A is important. Nevertheless, decreasing the size of the balls 10 leads to a merit that the vibrating mechanism 8 can be downsized, and conversely, increasing the size of the balls 10 leads to a merit that progress of wear of the balls 10 can be delayed.

The number of the balls 10 should be three or more from a viewpoint of preventing deflection amount of the drill T and the drill chuck 2 from increasing even when the drilling reaction is applied from the workpiece W. When the number of the balls 10 is increased, the number of the level differences 9A also increases according to the number of the balls 10, and therefore the interval between the level differences 9A adjacent to each other becomes short. Hence, when the number of the balls 10 is increased, the frequency of the drill T and the drill chuck 2 increases.

When the frequency of the drill T and the drill chuck 2 increases, a merit that chips can be made finer can be achieved while the cutting period per unit time becomes short since the interrupt frequency of drilling increases. Accordingly, it is desirable to confine the number of the balls 10 to one required in order to make a chip fine to a degree that chip clogging of the drill T can be fully avoided, from a viewpoint of preventing the cutting time from increasing. Note that, it is considered that the sufficient number of the balls 10 is three as long as a typical metal material, such as aluminum, is drilled under typical drilling conditions, such as a hole size, a hole depth, a rotating speed of the drill T, and the number of the cutting edges of the drill T.

It is also possible to vibrate the drill T and the drill chuck 2 at a predetermined frequency when the number of the level differences 9A formed on the sliding surface 9 is different from that of the balls 10 but equal to a multiple of the number of the balls 10. Nevertheless, it is appropriate to confine the number of the level differences 9A to one necessary for achieving the dividing effect of chip since the more the number of the level differences 9A is increased, the shorter the cutting period per unit time becomes, similarly to a case of increasing the number of the balls 10.

These conditions with regard to the balls 10 and the shape of the sliding surface 9 are the same in a case where the sliding surface 9 is not formed on the rotary ring 12 fixed to the drill chuck 2 but is formed on the static ring 11 fixed to the casing 4. When the sliding surface 9 is formed on the static ring 11 fixed to the casing 4, spherical concavities can be formed on the rotary ring 12 fixed to the drill chuck 2 so that the rotary ring 12 serves as a ball retainer. In that case, the balls 10 roll at constant positions relatively to the drill chuck 2 to which the rotary ring 12 is fixed. Therefore, when the drill T and the drill chuck 2 are normally rotated, the balls 10 also normally rotate while rolling on the sliding surface 9.

The above-mentioned tool driving device 1 generates periodic vibration, which distances the drill T and the drill chuck 2 from the workpiece W instantaneously and brings the drill T and the drill chuck 2 close to the workpiece W side slowly, using the vibrating mechanism 8 consisting of, e.g., the sliding surface 9, having appropriate concavities and convexities, and the balls 10 rolling on the sliding surface 9.

(Effect)

According to the tool driving device 1, chips can be divided finely and thereby discharged easily since the drill T is pulled apart from the workpiece W intermittently and periodically. Accordingly, deterioration in quality of a hole, such as excess in diameter of a hole in an FRP, caused by chip clogging in a groove of the drill T can be prevented. Therefore, when the drill T is held by the tool driving device 1 and the workpiece W is drilled by the drill T rotated by the tool driving device 1, a drilled product having a hole with high quality can be produced. For example, even when the workpiece W consisting of laminated FRP and metal, such as laminated CFRP and aluminum or titanium, is drilled as exemplified by FIG. 1, a drilled product having a hole with high quality can be produced since metal chips are divided and thereby do not clog any groove of the drill T.

In addition, trouble that the drill T is damaged due to collision of the drill T with the workpiece W and trouble that the tool driving device 1 held by hand of a user is pushed back by the drilling reaction can be avoided since the speed of the drill T is small at the time of approaching the workpiece W and change of the drilling reaction is also small in case of adopting the vibrating mechanism 8 of the tool driving device 1 while the conventional vibrating mechanism causes precipitous change of the vibrating direction when balls come out from concave portions as well as when the balls go into the concave portions, and thereby trouble that the drill collides with a workpiece or trouble that a user is pushed back due to instantaneously increased drilling reaction sometimes arises.

In addition, in case of the vibrating mechanism 8 of the tool driving device 1, wear of the balls 10 due to repeated collision of the balls 10 with edges of level differences can be avoided since there are no level differences, which the balls 10 ascend, on the sliding surface 9 although the conventional vibrating mechanism, which makes balls go into and come out from concave portions, causes a problem that the balls and the edges of the concave portions are worn away since the balls repeatedly contact with the edges of the concave portions when the balls come out from the concave portions.

(Second Implementation)

Figure 10:
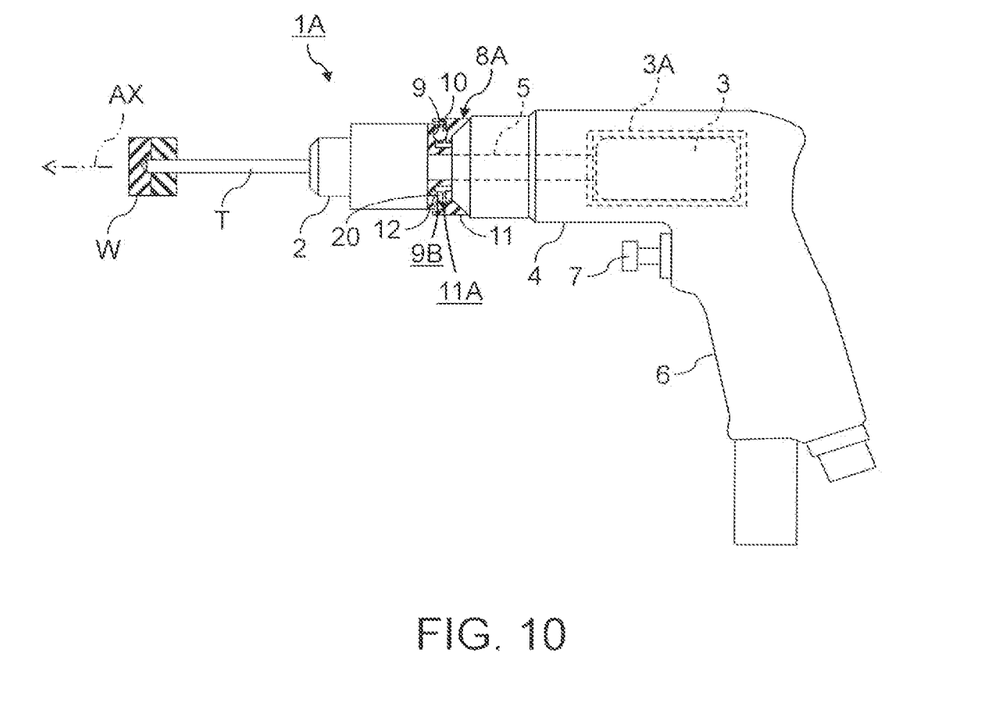
FIG. 10 is a partial sectional view showing structure of a tool driving device according to the second implementation of the present invention.

FIG. 10 is a partial sectional view showing structure of a tool driving device according to the second implementation of the present invention.

A tool driving device 1A in the second implementation shown in FIG. 10 is different from the tool driving device 1 in the first implementation in structure that a vibrating mechanism 8A has the balls 10 rolling while rotating relatively to both the drill chuck 2 and the casing 4. Other structure and actions of the tool driving device 1A in the second implementation are not substantially different from those of the tool driving device 1 in the first implementation. Therefore, only the vibrating mechanism 8A is illustrated, and the same signs are attached to the same elements and the corresponding elements while explanation thereof is omitted.

In case of rotating the balls 10 without fixing the positions of the balls 10 relatively to both the drill chuck 2 and the casing 4, what is necessary is to dispose an annular ball retainer 20, for holding parts of the balls 10 in a state where the balls 10 can roll, rotatably in the rotating direction of the drill chuck 2 including the normal rotation direction and the inverse rotation direction, i.e., around the tool axis AX, without fixing the ball retainer 20 to any of the drill chuck 2 and the casing 4. For example, the ball retainer 20 can be rotatably disposed in a space formed between the static ring 11 fixed to the casing 4 and the rotary ring 12 fixed to the drill chuck 2, as exemplified by FIG. 10.

Figure 11:
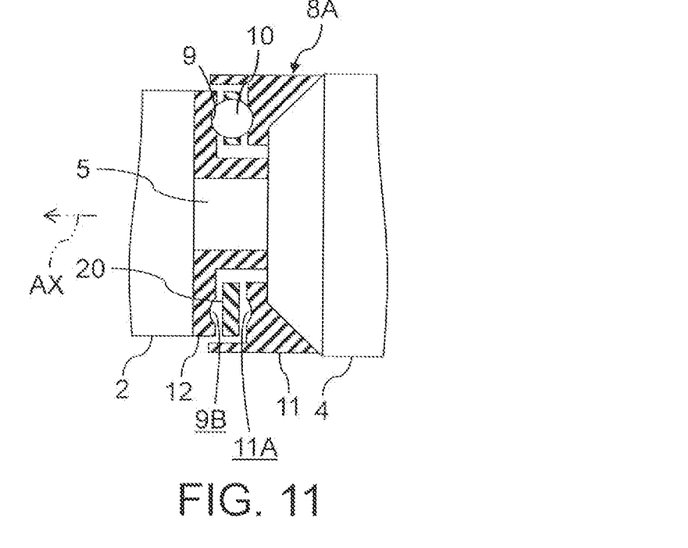
FIG. 11 is an enlarged partial longitudinal sectional view of the vibrating mechanism shown in FIG. 10.
Figure 12:
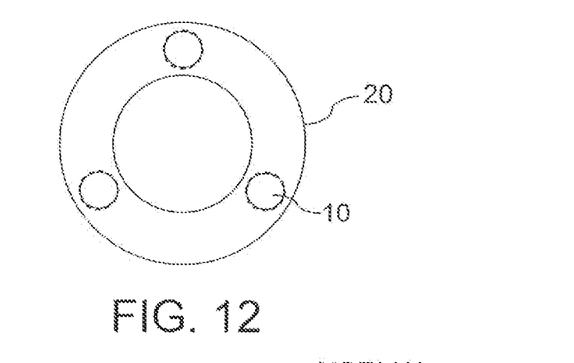
FIG. 12 is a left side view of the ball retainer shown in FIG. 11 in a state where the balls have been held by the ball retainer.
Figure 13:
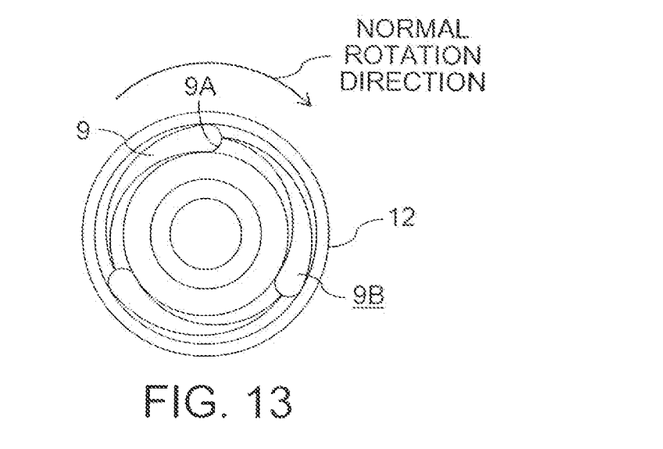
FIG. 13 is a right side view of the rotary ring shown in FIG. 11.

FIG. 11 is an enlarged partial longitudinal sectional view of the vibrating mechanism 8A shown in FIG. 10. FIG. 12 is a left side view of the ball retainer 20 shown in FIG. 11 in a state where the balls 10 have been held by the ball retainer 20. FIG. 13 is a right side view of the rotary ring 12 shown in FIG. 11.

As exemplified by FIG. 11 and FIG. 12, the balls 10 and the ball retainer 20, consisting of an annular plate having through holes whose number is same as that of the balls 10, can be disposed between the static ring 11 and the rotary ring 12 in a state where the balls 10 are held by the ball retainer 20. Note that, in the example shown in FIG. 11 and FIG. 12, the ball retainer 20 can be housed between the static ring 11 and the rotary ring 12 since the static ring 11 has a cylindrical edge whose inner diameter is larger than the outer diameter of the rotary ring 12.

As exemplified by FIG. 13, the rotary ring 12 has the sliding surface 9, having the level differences 9A, formed as the inner surface of the sloped groove 9B or the like, similar to that in the first implementation. As a matter of course, when the sloped groove 9B is formed on the rotary ring 12, the bottom of the groove 9B may be locally or partially sloped as exemplified by FIG. 7 to FIG. 9

When the ball retainer 20 can be rotated relatively to both of the static ring 11 and the rotary ring 12 as illustrated, the drilling reaction acts not only on the balls 10 from the rotary ring 12, but on the static ring 11 from the balls 10. Therefore, the balls 10 are rotated while rolling relatively to both the static ring 11 and the rotary ring 12 due to the frictional force between the balls 10 and the static ring 11, and the frictional force between the balls 10 and the rotary ring 12. That is, the balls 10 roll while rotating relatively to the drill chuck 2 and the casing 4.

For this reason, a groove 11A, having a constant depth, for rolling the balls 10 may be also formed on the static ring 11. In this case, making the shape of the cross section of the groove 11A such an arc that the inner surface of the groove 11A may fit with the balls 10 allows decreasing the progression rate of wear of the balls 10 since the balls 10 roll while coming into line contact with the inner surface of the groove 11A. As a matter of course, the sliding surface 9 having the level differences 9A, formed as the inner surface of the sloped groove 9B or the like may be formed on the static ring 11 side.

According to the above-mentioned second implementation, effect that the frictional force between the balls 10, and the static ring 11 and the rotary ring 12 can be reduced remarkably can be attained in addition to effect similar to that in the first implementation. Specifically, in a case where the balls 10 are held by a ball retainer consisting of the static ring 11 having spherical concavities like the first implementation, the balls 10 necessarily roll while sliding relatively to either the static ring 11 or the rotary ring 12. Accordingly, when the rotation speed of the drill T and the drill chuck 2 is large, the frictional force between the balls 10, and the static ring 11 and the rotary ring 12 also becomes large, and thereby the balls 10 may be worn out in a short time.

In particular, when drilling is performed with the drill T having a small tool diameter of about 3 mm to 10 mm, the rotation speed of the drill T becomes 2000 rpm to 6000 rpm in many cases. As a result of actual examinations using prototypes under the corresponding drilling conditions, it has been confirmed that the balls 10 were occasionally heated up to not less than 100° C. and worn out due to friction, and thereby the diameter of each ball 10 decreased. Therefore, when drilling is performed using the drill T having a small diameter, it is desirable to adopt the second implementation, which allows reducing the frictional force between the balls 10, and the static ring 11 and the rotary ring 12 to a negligible extent, from a viewpoint of securing a tool life.

OTHER IMPLEMENTATIONS

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A tool driving device for use in drilling a workpiece comprising:
 a drill chuck for holding a drill;
 a motor configured to rotate the drill chuck;
 a casing housing the motor; and
 a vibrator configured to periodically reciprocate the drill chuck relatively to the casing in a tool axis direction during rotation of the drill chuck,
 wherein the vibrator is configured to distance the drill chuck away from the casing and toward the workpiece at a first speed smaller than a second speed for bringing the drill chuck back closer to the casing, wherein the first and second speeds are a result of a sliding surface configuration with the sliding surface formed directly or indirectly on one of the drill chuck and the casing, and wherein the sliding surface has a first slope section and a second slope section with the first slope section defining a downward slope and the second slope section defining an upward slope, with the downward slope being steeper than the upward slope, and with the upward slope having guidance edging converging circumferentially in a direction away from the end of the downward slope, and wherein the vibrator includes:

balls rollingly disposed between the drill chuck and the casing, the balls being disposed away from each other at regular intervals on a same circle; and the balls being contacted to the sliding surface while rolling during the rotation of the drill chuck, wherein the balls fall simultaneously during normal rotation of the drill chuck into equally spaced level differences of the sliding surface, and the sliding surface changes smoothly from each level difference toward an adjacent level difference, no level differences at which the balls ascend during the normal rotation of the drill chuck being formed on the sliding surface by the smoothly changing sliding surface, and wherein the vibrator further includes a ball retainer holding the balls rollingly, the ball retainer being rotatable around a tool axis, the balls rolling while rotating relatively to the drill chuck and the casing.

2. The tool driving device according to claim 1 wherein the return slope rises to an upward end that is at a groove level in the sliding surface that is maintained at a constant level in extending circumferentially away from the upward end of the return slope until the next one of the equally spaced level differences.

3. The tool driving device according to claim 1, wherein after the balls fall simultaneously during normal rotation of the drill chuck into the equally spaced level differences the balls rise, while running along the guidance edging converging circumferentially, in a direction away from the end of the downward slope.

4. The tool driving device according to claim 3, wherein at a maximum depth of each of the downward slopes there is a concave depression configured for reception of a respective one of the balls.

5. The tool driving device according to claim 1, wherein, relative to the tool axis direction, the vibrator is positioned between the chuck and the motor and the motor shifts together with the drill chuck along the tool axis direction at the first and second speeds.

6. The tool driving device according to claim 1, wherein the radially spaced end edging of the surface grooving converges as to define a V-groove.

7. A method of producing a drilled product comprising:
holding the drill by the tool driving device according to claim 1; and
producing the drilled product by drilling the workpiece by the drill rotated by the tool driving device.

8. A method of producing a drilled product comprising:
holding the drill by the tool driving device according to claim 6; and
producing the drilled product by drilling the workpiece by the drill rotated by the tool driving device.

9. A tool driving device for use in drilling a workpiece comprising:
a drill chuck for holding a drill;
a motor configured to rotate the drill chuck;
a casing housing the motor; and
a vibrator configured to periodically reciprocate the drill chuck relatively to the casing in a tool axis direction during rotation of the drill chuck,
wherein the vibrator is configured to distance the drill chuck away from the casing and toward the workpiece at a first speed smaller than a second speed for bringing the drill chuck back closer to the casing, and wherein the vibrator comprises a sliding surface formed directly or indirectly on one of the drill chuck and the casing, wherein the sliding surface includes surface grooving with an inner surface of the surface grooving being elongated in a circumferential length direction corresponding with a rotation direction of the vibrator, and with the surface grooving providing equally spaced level differences to enable the periodical reciprocation of the drill chuck relative to the casing in a tool axis direction during rotation of the drill, and wherein the vibrator includes a static ring and a rotary ring with the static ring remaining stationary with the casing while the rotary ring rotates relative to the static ring in going from a higher level to a lower level relative to the spaced level differences, and wherein there is a drop slope in the surface grooving that is greater than a return slope in the surface grooving, and wherein the surface grooving comprises radially spaced guidance edges each extending circumferentially and defining radially spaced end edging of the surface grooving that extends down into an exposed surface of a respective one of the static and rotary rings in which the surface grooving is provided, and wherein the vibrator includes:

balls rollingly disposed between the drill chuck and the casing, the balls being disposed away from each other at regular intervals on a same circle; and the balls being contacted to the sliding surface while rolling during the rotation of the drill chuck, wherein the equally spaced level differences in the slide surface result in the balls falling simultaneously during normal rotation of the drill chuck, and the sliding surface changes smoothly from each level difference toward an adjacent level difference, and no level differences at which the balls ascend during the normal rotation of the drill chuck are formed on the sliding surface by the smoothly changing sliding surface, and wherein the vibrator further includes a ball retainer holding the balls rollingly, the ball retainer being rotatable around a tool axis, the balls rolling while rotating relatively to the drill chuck and the casing.

10. The tool driving device according to claim 9, wherein the radially spaced end edging of the surface grooving converges as to define a V-groove.

11. The tool driving device according to claim 9, wherein at a maximum depth of the drop slope there is a concave depression configured for reception of a respective one of the balls.

12. The tool driving device according to claim 9 wherein the return slope rises to an upward end that is at a groove level in the sliding surface that is maintained at a constant level in extending circumferentially away from the upward end of the return slope until the next one of the equally spaced level differences.

13. The tool driving device according to claim 9, wherein, relative to the tool axis direction, the vibrator is positioned between the chuck and the motor and the motor shifts together with the drill chuck along the tool axis direction at the first and second speeds.

14. A method of producing a drilled product comprising:
holding the drill by the tool driving device according to claim 9; and
producing the drilled product by drilling the workpiece by the drill rotated by the tool driving device.

15. A tool driving device for use in drilling a workpiece comprising:
a drill chuck for holding a drill;

a motor configured to rotate the drill chuck;
a casing housing the motor; and
a vibrator configured to periodically reciprocate the drill chuck relatively to the casing in a tool axis direction during rotation of the drill chuck,
wherein the vibrator is configured to distance the drill chuck from the casing and toward the workpiece at a first speed smaller than a second speed for bringing the drill chuck back closer to the casing, and wherein the vibrator comprises a sliding surface formed directly or indirectly on one of the drill chuck and the casing, wherein the sliding surface includes surface grooving with an inner surface of the surface grooving being elongated in a circumferential length direction corresponding with a rotation direction of the vibrator, and with the surface grooving providing equally spaced level differences to enable the periodical reciprocation of the drill chuck relative to the casing in a tool axis direction during rotation of the drill chuck, and wherein the vibrator includes:
balls rollingly disposed between the drill chuck and the casing, the balls being disposed away from each other at regular intervals on a same circle; and
the balls being contacted to the sliding surface while rolling during the rotation of the drill chuck,
wherein the balls fall simultaneously during normal rotation of the drill chuck into the equally spaced level differences, and wherein at least a part of the circumferentially extending surface grooving has a radially extending cross-section that defines an arc having a common radius as that of the balls, and
the sliding surface changes smoothly from each level difference toward an adjacent level difference, and wherein the vibrator further includes a ball retainer holding the balls rollingly, the ball retainer being rotatable around a tool axis, the balls rolling while rotating relatively to the drill chuck and the casing.

16. The tool driving device according to claim 15, wherein end edging of the surface grooving converges as to define a V-groove.

17. The tool driving device according to claim 15, wherein
after the balls fall simultaneously during normal rotation of the drill chuck into the equally spaced level differences the balls rise, while running along the guidance edging, in a direction away from the end of the downward slope.

18. The tool driving device according to claim 15, wherein, relative to the tool axis direction, the vibrator is positioned between the chuck and the motor and the motor shifts together with the drill chuck along the tool axis direction at the first and second speeds.

19. A method of producing a drilled product comprising:
holding the drill by the tool driving device according to claim 15; and
producing the drilled product by drilling the workpiece by the drill rotated by the tool driving device.

* * * * *